United States Patent [19]
Choy

[11] 3,990,788
[45] Nov. 9, 1976

[54] TURN AND TILT SPECTACLES
[76] Inventor: Angelo Ley Choy, 1276 Rogers Ave., Brooklyn, N.Y. 11226
[22] Filed: Sept. 26, 1975
[21] Appl. No.: 616,874

[52] U.S. Cl. .................................... 351/59; 351/85
[51] Int. Cl.² .................................... G02B 21/24
[58] Field of Search .......................... 351/59, 60, 85

[56] References Cited
UNITED STATES PATENTS

| | | | |
|---|---|---|---|
| 505,650 | 9/1893 | Francis | 351/59 |
| 2,388,626 | 11/1945 | Wilson | 351/59 |
| 2,786,390 | 3/1957 | Zanetti | 351/59 |

Primary Examiner—Harold A. Dixon
Attorney, Agent, or Firm—Richard L. Miller

[57] ABSTRACT

Lens holder supporting lens frames in spectacles are connected to a rotatable shaft mounted within a main supporting frame. Snap-on covers or braces are provided in the main supporting frame and have downwardly extending ribs forming a groove for the reception of the rotatable shaft. The snap-on covers or braces are spaced from each other to allow for the mounting of the lens holder in the main supporting frame, the main supporting frame being provided with a groove for allowing the lens holder to rotate with the shaft.

11 Claims, 13 Drawing Figures

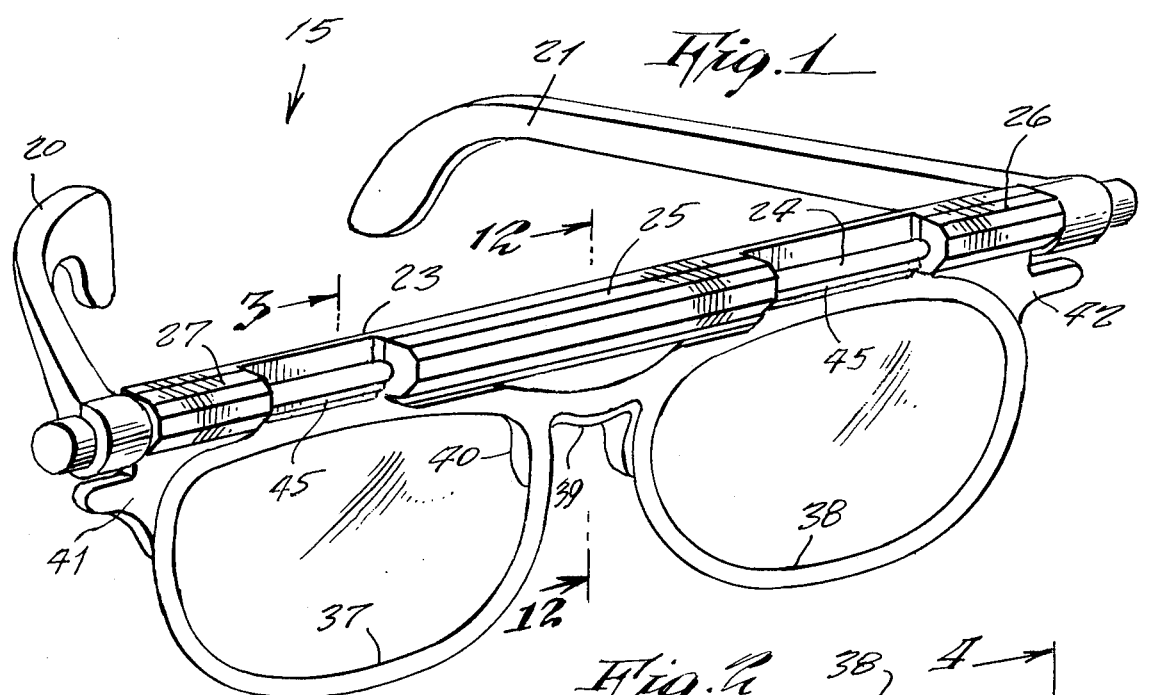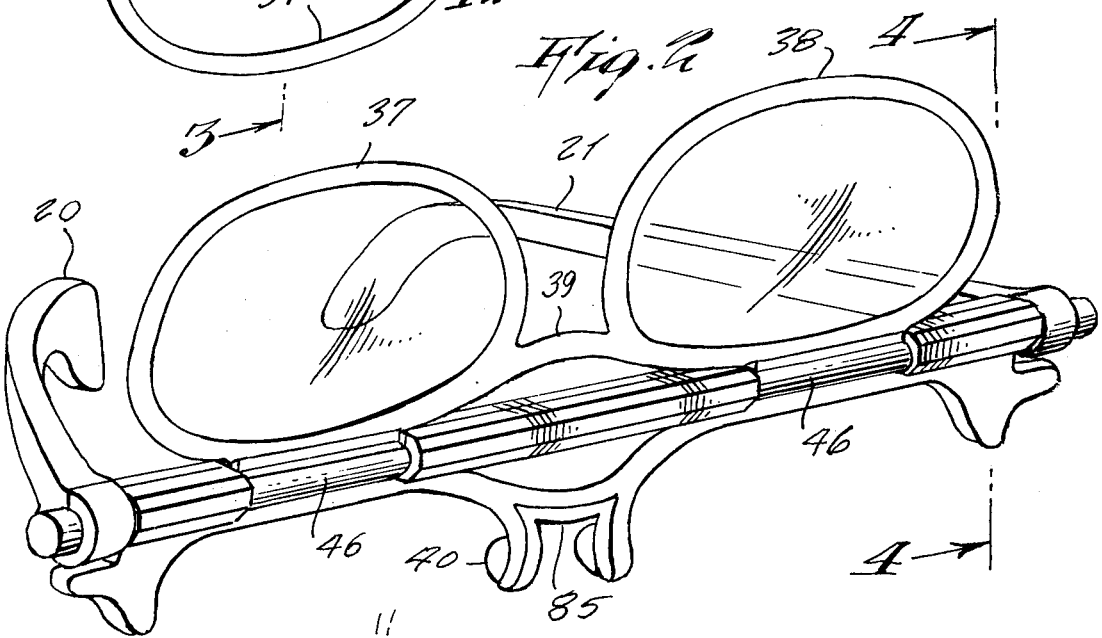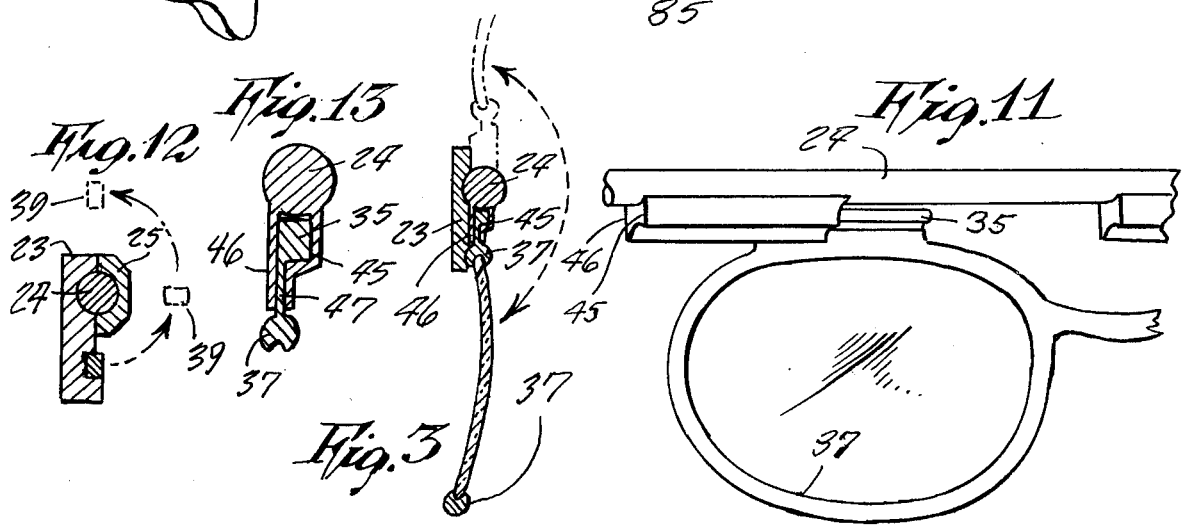

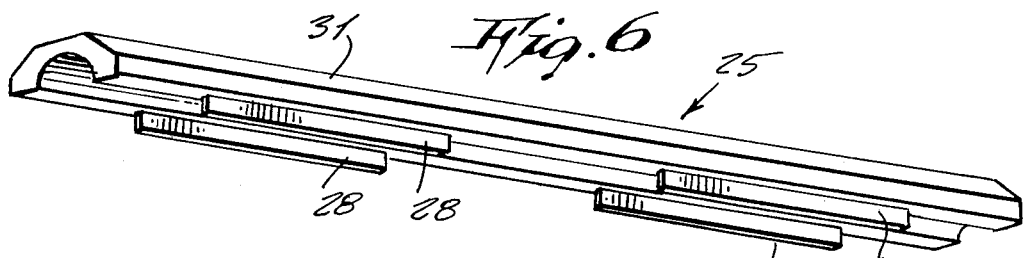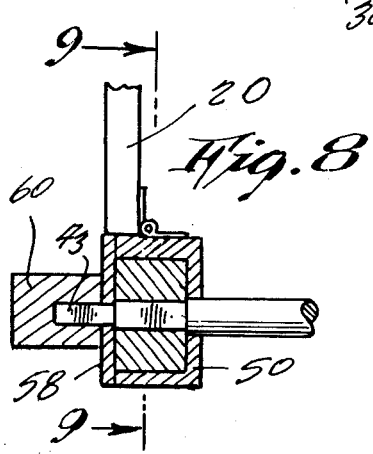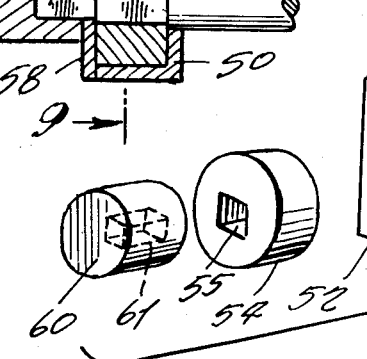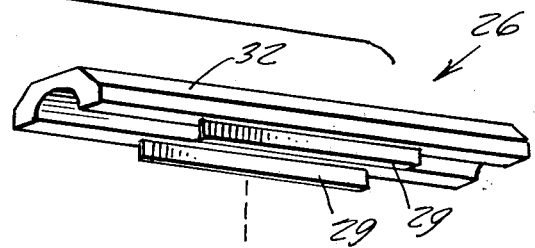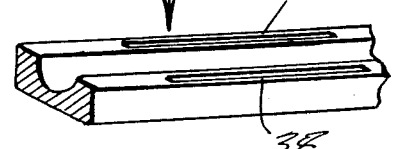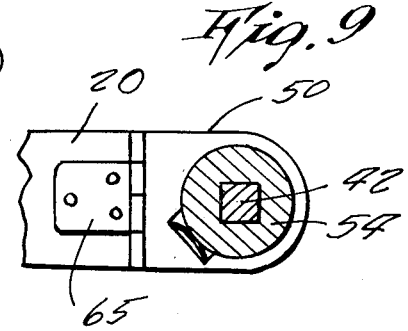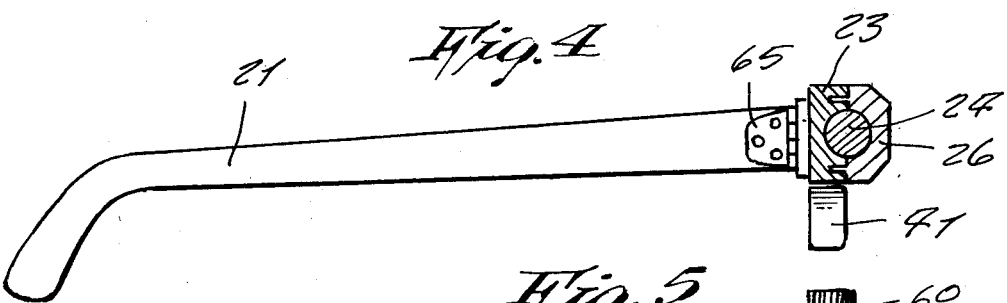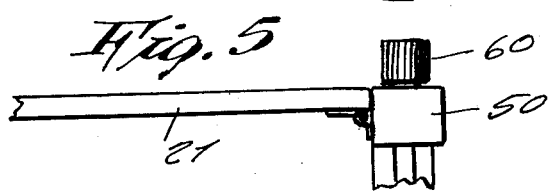

TURN AND TILT SPECTACLES

BACKGROUND OF THE INVENTION

The present invention is directed to spectacles and specifically to spectacles whose lens may be pivoted away from the user's line of sight. It is known that in some trades that require the sighting of objects at different distances, it is inconvenient to remove the spectacles in their entirety. Therefore, in order to make it easier for a tradesman or the like, it has been known to provide spectacles whose lens and lens supporting frames are pivotal away from the line of sight.

However, the prior art spectacles have suffered from the inability to withstand continued use, and to combine the utility of pivoting the lens and lens frames along with structural parts that may lend aesthetic design.

SUMMARY OF THE INVENTION

It is therefore the prime object of the present invention to provide spectacles that will combine the utility of pivoting the lens and lens frames with structure that will be long lasting and fashionable to wear.

When these spectacles are used, it eliminates the trouble constant removal and reposition, whenever the user wants to switch from reading range lenses to farsighted vision, he simply has to turn the knob on either side in order. To flip up the lenses the knob is turned in the proper direction. The lenses will be floped down to there original position and restore vision for reading or close-up work by conversely turning the knob in the opposite direction.

A further advantage of these spectacles are that they remain firmly in position on the user's face and require no further adjustment except for the rotation of the lenses.

These spectacles offer more advantage than bifocal or trifocal spectacles, because they permit the user to look through the full angle of viewing area either for reading, close-up or farsight vision which the bifocal and trifocal fail to accomplish.

It should also be noted that these spectacles are safer than bifocal and trifocal eyeglasses to the extend that there is no possibility of confused vision from focusing on the intersection of two lenses, a feature which is convenient for users who work with tools or do any other kind of close-up work such as surgeons, dentists, etc.

A still further advantage is that the lenses may be moved without being touched directly by hand and therefore, will not become finger printed.

In accordance with the prime object, the spectacles of the present invention are provided with pivotal lens frames firmly connected to a rotatable shaft. The rotatable shaft is encased through most of its length to prevent dirt and other foreign particles from affecting the operation of the device.

The spectacles of the present invention are provided with a main frame encasing the rotatable shaft, which main frame has an opening along a portion thereof to receive snap-on covers that protect the rotatable shaft and give it adequate support. The rotatable shaft is mounted in a pair of bearing housings at both ends that allow for a knob to rotate the shaft to pivot the lens holders and lens to an up or down position.

BRIEF DESCRIPTION OF THE DRAWING

The invention will be more readily comprehended from the following description when taken in conjunction with the accompanying drawings, wherein:

FIG. 1 is a front perspective view of the spectacles of the present invention showing the lens pivoted in the down position.

FIG. 2 is a view similar to FIG. 1 showing the lens pivoted in the up position.

FIG. 3 is a cross-sectional view taken along line 3—3 of FIG. 1.

FIG. 4 is a cross-sectional view taken along line 4—4 of FIG. 2.

FIG. 5 is a fragmentary top view of FIG. 4;

FIG. 6 is a perspective view showing the middle snap-on cover of the spectacles of the present invention.

FIG. 7 is a perspective view showing the two outer snap-on covers of the present invention.

FIG. 8 is a top view showing an enlarged cross-section of the rotatable shaft and bearing of the present invention;

FIG. 9 is a cross-section taken along line 9—9 of FIG. 8.

FIG. 10 is an exploded view of the means for rotatably supporting the rotatable shaft of the present invention.

FIG. 11 is an exploded view showing a lens frame partly removed from the lens holder of the present invention;

FIG. 12 is a cross-section taken along line 12—12 of FIG. 1; and

FIG. 13 is an enlarged view showing the rotatable shaft and lens holders without the main frame.

DETAILED DESCRIPTION OF THE INVENTION

Referring now to the drawings, there is shown in FIG. 1 the spectacles of the present invention generally indicated by numeral 15. The spectacles 15 has a main supporting frame 23 which is of semi-circular construction as seen in FIG. 7. The main supporting frame receives in its hollow interior a rotatable shaft 24 which has extending therefrom two pairs of ears 45 and 46, the two pairs being spaced along the longitudinal length of the shaft in order to support therein two lens holders 35 to which are attached two lens frames 37, 38 as shown in FIGS. 1 and 2. FIGS. 3 and 13 show in greater detail the ears 45, 46 and the lens holders. FIG. 3 shows the rotatable shaft within the main supporting frame. FIG. 3 shows the rotatable shaft and ears in order that the structure supporting the lens holders in the rotatable shaft is made clearer.

In FIG. 3, one pair of ears is shown in which a first ear 46 extends downwardly and parallel with the main supporting frame, while another ear 45, of stepped configuration, extends from the diametrically opposite point of the shaft 24 to form a tight opening therebetween that receives the lens holder 35. The lens holders each have a larger rectangular portion that rests between the ears and a long thin portion ending in a coupling member 47 that is mounted to the lens frame. Therefore, as the rotatable shaft is pivoted from the down, user position shown in FIG. 1, to an up, non-use position, the lens holders and lens frames will accordingly pivot with the shaft.

In order to firmly support the rotatable shaft 24 for rotation, and in order to allow easy access to the interior working parts of the device, three covers are provided that fit over the rotatable shaft and snap into the main supporting frame. As best seen in FIGS. 6 and 7, a middle cover 25, and a left outer cover 26, and a right outer cover 27 are provided along the main supporting frame. Each snap-on cover has a main curved portion 31, 32, 33 from which extends perpendicular ribs 28, 29 and 30, respectively. Each of the ribs are received by grooves 34 formed in the main supporting frame so that after assembly of the covers, the shaft is surrounded by the main supporting frame and the covers along most of the length thereof, as can be seen in FIG. 12. The covers 25, 26, 27 snap into the main supporting frame due to the ribs reception into the grooves 34. The depth of the groove is such that the ribs will extend fully into the groove, the curved portions of the covers 25, 26, 27 therefore meeting flush with the main supporting frame. With this snug fit, the rotatable shaft is firmly yet rotatably held in position, enough clearance being provided between the rotatable shaft and the main supporting frame and covers to allow for the rotation thereof.

The left and right outer covers 26, 27 are spaced longitudinally of the middle cover 25 so that the lens holders 35, 36 may be connected to the rotatable shaft, by means of the two pairs of ears, and so that the frames may pivot when the shaft is rotated.

The rotatable shaft is rotatably mounted at both ends. Referring to FIGS. 8 and 9, each end of the rotatable shaft 24 is provided with a stepped configuration where a first rectangular extension 42 turns into a second smaller rectangular extension 43. Mounted to the ends of the main frame 23 are a pair of drum housings 50 each of which has a circular opening 51 for the passage of the rotatable shaft therethrough. The housing 50 has a recessed circular opening 57 which rotatably mounts a drum 54 therein. The drum 54 has formed therethrough a rectangular opening 55 of cross-section closely fitting the rectangular extension 42 of the shaft. Mounted within a slot 52 in the recessed opening 57 is a detent means, such as a steel spring, that binds the drum 54 so that it does not rotate freely. That is, the detent means 53 serves to hold the drum 54 and thereby the rotatable shaft 24 in the desired up or down position. A cover 58 is mounted on the side of the housing opposite to the opening 51 to enclose the drum 54.

Mounted outside of the cover 58, is a knob 60 which has a rectangular opening 61 formed therein that closely fits the cross-section of the rectangular extension 43. The extension 43 fits snugly into the knob 60 via the opening 61 so that upon rotation of the knob, the drum 54 and shaft 24 rotate therewith, to thereby pivot the lens holders and frames into an up or down position. Whichever position the lens holders and frames are in, the detend means 53 will hold them in that position.

The spectacles of the present invention is provided with the usual nose guard 85 with nose rests 40, the temple bars 20 and 21. The temple bars 20, 21 are pivoted on the housing 50 by way of a conventional hinge 65 as shown in FIGS. 4 and 5.

The lens frames 37 and 38 may be mounted on the lens holders 35 and 36 so that replacement and interchangeability thereof is possible. As shown in FIG. 11, the lens frame 37 is provided with a sliding extention 35 that is slidable in an opening between ears 45 and 46.

The spectacles of the present invention therefore allow for the pivoting of the lens frames toward and away from the user's eyes by the mere rotation of the knobs 60 and are held in place by the detent means 53.

As shown in FIG. 12, the lens bridge 39 pivots from the down user position shown in solid line in FIG. 12, to an upper non-use position shown in dotted line in FIG. 12, the lens and lens bridge 39 pivoting counterclockwise as indicated by the arrows.

While a specific embodiment of the invention has been disclosed, it is to be understood that numerous modifications may be made without departing from the scope of the invention.

What is claimed is:

1. Spectacles comprising a main supporting frame having a hollow interior and grooves extending along a major part of the length thereof, a rotatable shaft mounted within said main supporting frame having a first and a second end extending beyond the ends of said main supporting frame; cover means mounted in said main supporting frame having downwardly extending ribs forming a channel for holding said rotatable shaft therein, said cover means mounted on said main supporting frame and extending along a portion thereof and covering said groove along said portion, said portion being discontinuous so that said groove is left uncovered along at least two sections thereof; a first and a second lens holder, each being firmly connected with said rotatable shaft, said first lens being mounted for rotatable movement in one of said at least two sections, and said second lens holder being mounted for rotatable movement in another of said at least two sections; a first and a second lens frame, said first lens frame being carried by said first lens holder and said second lens frame being carried by said second lens holder; and means mounted at both ends of said main supporting frame for rotatably mounting said rotatable shaft.

2. The spectacles according to claim 1 wherein said main supporting frame further comprises a nose guard, and nose rests intergrally mounted on said nose guard for supporting the weight of said main supporting frame on user's nose.

3. The spectacles according to claim 1 wherein each of said first and second lens holders comprises a pair of ears form along the length thereof, and each of said first and second lens frames comprises a longitudinal extension for sliding movement in said ears of said lens holders.

4. The spectacles according to claim 1, further comprising a pair of temple bars pivotally mounted at each end of said main supporting frame, and a lens bridge mounted between said first and second lens frames.

5. The spectacles according to claim 1, wherein said means for rotatably mounting said rotatably shaft comprises a drum housing mounted at each end of said main supporting frame, said drum housing having a hole formed therein for the passage of said rotatable shaft therethrough; a drum mounted within each drum housing having an opening therein for the reception of said rotatable shaft; a cover plate for said drum housing having an opening in alignment with said hole and said opening of said drum; detent means mounted in each drum housing for binding said drum into a non-freely rotatable state; and a knob for each end of said rotatable shaft mounted outside of said cover plate and having an opening for the reception of an end of said rotatable shaft, said rotatable shaft having at its first and second ends a stepped configuration for mating engagement with said opening of said drum and said opening of said knob.

6. The spectacles according to claim 5, wherein said opening of said drum is of rectangular shape, said opening of said knob is also of rectangular shape, said opening of said drum being larger than said opening of said knob, and said stepped arrangement comprises a first rectangular portion corresponding with said rectangular opening of said drum and a second rectangular portion extending from said first rectangular portion and outwardly therefrom, said second rectangular portion being smaller in cross-section than said first rectangular portion, said second rectangular portion corresponding with said rectangular opening of said knob.

7. The spectacles according to claim 5, wherein each drum housing comprises a recessed portion for the rotatable mounting of said drum therein, said recessed portion having a groove formed in its outer part thereof for receiving said detent means.

8. The spectacles according to claim 7, wherein said detent Means comprises a steel spring mounted in said groove of said recessed portion, said spring being in abutting contact with said drum.

9. The spectacles according to claim 1, wherein said cover means comprises a middle snap-on cover mounted in the middle portion of said main supporting frame, a first outer snap-on cover mounted near one end of said main supporting frame, and a second outer snap-on cover mounted near the other end of said main supporting frame.

10. The spectacles according to claim 9, wherein said first outer cover is separated from said middle cover to form one of said at least two sections, and said second outer cover is separated from said middle cover to form another of said at least two sections.

11. The spectacles according to claim 9, wherein each of said snap-on covers comprises downwardly extending ribs forming a passage therebetween, said main supporting frame having a pair of grooves extending longitudinally thereof for receiving said ribs to thereby hold the covers thereon, and said rotatable shaft comprises a first and a second downwardly extending pair of ears, said first lens frame being mounted between said first pair of ears, and said second lens frame being mounted between said second pairs of ears.

* * * * *